May 14, 1968     B. E. ATCHLEY     3,382,512
BABY FOOD INSTRUMENT - DO-DAD HELPMATE
Filed Nov. 20, 1964
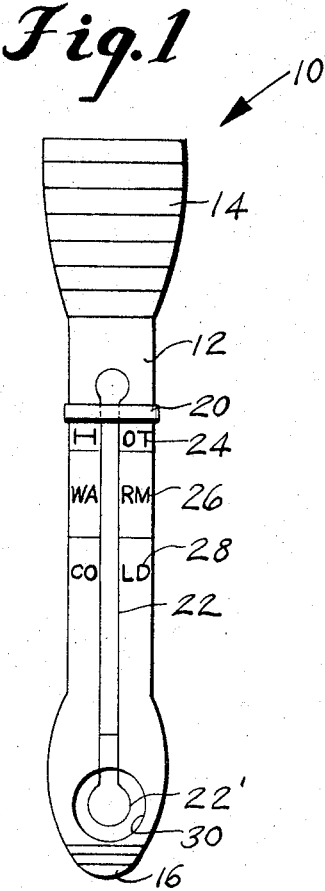
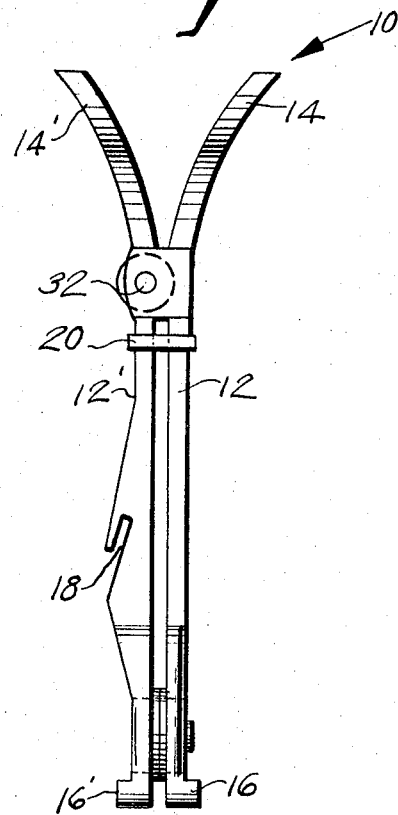

United States Patent Office 3,382,512
Patented May 14, 1968

3,382,512
BABY FOOD INSTRUMENT—DO-DAD HELPMATE
Billie E. Atchley, Box 173,
Ashton, Idaho 83420
Filed Nov. 20, 1964, Ser. No. 412,750
4 Claims. (Cl. 7—3)

ABSTRACT OF THE DISCLOSURE

The present invention relates to a food handling instrument and more particularly to an instrument comprising a plurality of lever members with a fulcrum means disposed thereon and with gripper means on one end thereof for grasping the inner surface of a jar of baby food and the like, and arcuate spaced apart members on the other end thereof for pressing together so as to cause the gripper members to engage the inner surface of a jar. The device is further provided with temperature means for indicating the temperature of the food within the jar.

---

This invention relates to food handling instruments, and more particularly to a combination baby food instrument.

It is an object of the present invention to provide a baby food instrument which will have curved lip means which will fit under the rim of a baby food bottle, thus enabling the bottle to be lifted and will have a spoon shaped end to provide a means for easily stirring the baby food.

Another object of the present invention is to provide a baby food instrument which will be made of plastic and will have a thermometer encased in the device to provide a means of quickly determining the temperature of the baby food.

A further object of the present invention is to provide an instrument which will have a scissor action to permit lifting the baby food out of hot water without burning the fingers.

A still further object of the present invention is to provide an instrument of the above-mentioned type which will utilize a rubber band to impart a closing action on the scissor-like structure of the device, and the two main body members will have pivot pin means to permit freedom of movement of the separate main body members. The present invention permits the production of a safer and more sanitary meal for the baby, and further provides safer removal of the jar of baby food from boiling water.

Other objects of the invention are to provide a baby food instrument bearing the above objects in mind which is of simple construction, has a minimum number of parts, is inexpensive to manufacture and efficient in operation and use.

For other objects and for a better understanding of the invention, reference may be had to the following detailed description taken in conjunction with the accompanying drawing, in which:

FIGURE 1 is a front view of the present invention shown in elevation;

FIGURE 2 is a side view of FIGURE 1.

Referring now more in detail to the drawing, a baby food instrument 10 made in accordance with the present invention is shown to include an elongated plastic body member 12 and 12' which form the halves of the instrument 10. Body members 12 and 12' are provided with an arcuate end 14 and 14' respectively which serve as finger grip lever means for opening the device to receive a jar of baby food between the ends 16 and 16' respectively. Ends 16 and 16' are arcuately curved to permit them to fit under the rim of the jar of baby food to enable the bottle or jar to be lifted. Body member 12' is provided with an angularly recessed slot 18 which is slightly curved to correspond to the rim of a baby food jar to enable instrument 10 to be suspended within the baby food jar in order to observe the temperature of the food contained within the jar. A rubber band 20 is received around body members 12 and 12' beneath the pivot area of the device and provides a means for returning or closing ends 16 and 16' of instrument 10 after they have been opened. A thermometer 22 having a bulb 22' is recessed into instrument 10, and the words "hot" 24, "warm" 26, and "cold" 28 are raised upon body member 12, and the areas surrounding the words may be color-coated to quickly indicate the temperature of the baby food. A circular opening 30 through ends 16 and 16' of instrument 10 provides a means for the baby food to surround the bulb 22' of the thermometer 22 to quickly indicate the temperature of the baby food. A pivot pin 32 is received through members 12 and 12' and provides a means for instrument 10 to have a scissor-like action to grippingly engage baby food jars.

In use, in order to lift a jar from the hot water in which the jar is being heated, ends 14 and 14' of body members 12 and 12' respectively are pressed together toward each other with the fingers of the user, thus ends 16 and 16' open or spread apart, and grippingly engage baby food jar to enable the user to lift it clear of the hot water without injury. The rubber band 20 serves to close ends 16 and 16'. When checking the temperature of the baby food, instrument 10 is lowered into the jar, and the rim of the jar is placed into the slot 18 of instrument 10 which will support instrument 10 so that a temperature reading can be made with the use of the thermometer 22.

It shall be noted that the spoon-like configuration of ends 16 and 16' provide a means for easily stirring the baby food, and also circulating the baby food passed the bulb 22' of the thermometer 22 within instrument 10.

It shall further be noted that the rubber band 20 is received beneath the pivot pin 32 to provide for maximum closing pressure upon the ends 16 and 16' when necessary.

While various changes may be made in the detail construction, it shall be understood that such changes shall be within the spirit and scope of the present invention as defined by the appended claims.

What I claim as new and desire to protect by Letters Patent of the United States is:

1. A baby food instrument comprising, in combination, a pair of elongated plastic body members, a pivot pin carried by said body members providing a means for a scissor-like action for gripping baby food jars, a rubber band carried by said body members providing tension means for closing the jaw ends of said body members, a thermometer carried by one of said body members providing a means for indicating the temperature of baby food, the upper extremities of said body members being arcuately curved away from each other to provide a means for gripping with the fingers to urge said ends together and opening the jaw ends of said body members of said instrument, said jaw ends of said body members being arcuately curved to fit the jar of baby food and enabling said instrument to lift said jar of baby food from hot water without injury to the user, said pivot pin being received through both of said body members and securing said body members together to allow said body members to pivot when said arcuate ends of said body members are compressed, and said rubber band is received beneath said pivot pin, said rubber band encompassing the outer surfaces of said body members and urging said jaw ends of said device together when pressure is released from said arcuate ends of said body members, said jaw ends of said body members being spoon-shaped in configuration to provide easy stirring of said baby food, said thermometer being recessed into one of said body members to provide a means for indicating the temperature of said baby food when said instrument is placed into a jar, said body members being provided with raised lettering on either side of said thermometer and indicating by the words "hot," "warm" or "cold" the temperature of the baby food, and angular slot members in one of said body members providing a means for said instrument to be received over the edge of said jaw of baby food to hold said instrument within said baby food within said jar.

2. The combination according to claim 1 wherein the bulb of said thermometer received within one of said body members is exposed within a circular opening through said spoon-shaped configurated jaw ends of said instrument, and when said instrument is placed within said baby food, said food enters said opening and encompasses said bulb of said thermometer to provide instant temperature reading of said food.

3. A baby food instrument comprising, in combination, a pair of elongated body members, pivot means carried by said body members providing a means for a scissor-like action for gripping baby food jars, biasing means carried by said body members providing tension means for closing the jaw ends of said body members, a thermometer carried by one of said body members providing a means for indicating the temperature of baby food, the upper extremities of said body members being curved away from each other to provide a means for gripping with the fingers to urge said ends together and opening the jaw ends of said body members of said instrument, said jaw ends of said body members being curved to fit the jar of baby food and enabling said instrument to lift said jar of baby food from hot water without injury to the user, said pivot means being received through both of said body members and securing said body members together to allow said body members to pivot when said curved ends of said body members are compressed, and said biasing means is received beneath said pivot means, said biasing means encompassing the outer surfaces of said body members and urging said jaw ends of said device together when pressure is released from said curved ends of said body members, said jaw ends of said body members being shaped to provide easy stirring of said baby food, said thermometer being recessed into one of said body members to provide a means for indicating the temperature of said baby food when said instrument is placed into a jar, and angular slot members in one of said body members providing a means for said instrument to be received over the edge of said jar of baby food to hold said instrument within said baby food within said jar.

4. The instrument of claim 3 wherein the jaw ends of said members have outwardly extending projections on the outer surfaces thereof extending in opposite directions therefrom to form gripper shoulders for grasping the inside wall of a baby food jar.

References Cited
UNITED STATES PATENTS

| | | | |
|---|---|---|---|
| 138,800 | 5/1873 | Grover | 73—34 |
| 782,433 | 2/1905 | Aslley | 73—376 |
| 1,277,946 | 9/1918 | Kenkel | 294—3 |
| 2,707,126 | 4/1955 | Williams | 81—5.1 |
| 2,906,124 | 9/1959 | Chaney | 73—374 |

LOUIS R. PRINCE, *Primary Examiner.*

W. A. HENRY, *Assistant Examiner.*